United States Patent [19]

Ruehle

[11] Patent Number: 4,476,551
[45] Date of Patent: Oct. 9, 1984

[54] SELECTING OFFSET AS A FUNCTION OF TIME AND VELOCITY TO STACK SEISMOGRAMS WITH HIGH SIGNAL TO NOISE RATIO

[75] Inventor: William H. Ruehle, Duncanville, Tex.

[73] Assignee: Mobil Oil Corporation, New York, N.Y.

[21] Appl. No.: 221,874

[22] Filed: Dec. 31, 1980

[51] Int. Cl.$^3$ .............................................. G01V 1/36
[52] U.S. Cl. ....................................... 367/43; 367/56; 367/59
[58] Field of Search ........................ 367/53, 52, 63, 74, 367/37, 43, 56, 59; 340/15.5

[56] References Cited

U.S. PATENT DOCUMENTS

| | | | |
|---|---|---|---|
| 3,449,047 | 6/1969 | Hartmann | 367/37 |
| 3,651,451 | 3/1972 | Ruehle | 367/52 |
| 3,696,331 | 10/1972 | Guinzy et al. | 367/53 |
| 4,206,509 | 6/1980 | Ruehle | 367/42 |
| 4,241,429 | 12/1980 | Bloomquist et al. | 367/53 |
| 4,316,268 | 2/1982 | Ostrander | 367/74 |

OTHER PUBLICATIONS

J. A. Coffeen, "Seismic Exploration Fundamentals", PPC Books, a Division of The Petroleum Publishing Co., Tulsa, Okla., pp. 108, 109 and FIGS. 5–15.

Primary Examiner—Nelson Moskowitz
Assistant Examiner—K. R. Kaiser
Attorney, Agent, or Firm—A. J. McKillop; M. G. Gilman; F. J. Kowalski

[57] ABSTRACT

In seismic exploration a method for improving seismogram displays is disclosed wherein seismograms having an offset which produces poor signal power are muted and seismograms having offsets with high signal power are stacked. The signal power in a CDP set is determined as a function of different values of assumed acoustic velocity of the earth. This signal detection is repeated for successive values of travel time and offset. The maximum signal power is plotted for values of velocity as a function of travel time and for different ranges of offset to form contours of the maximum signal power as a function of time and offset.

2 Claims, 7 Drawing Figures

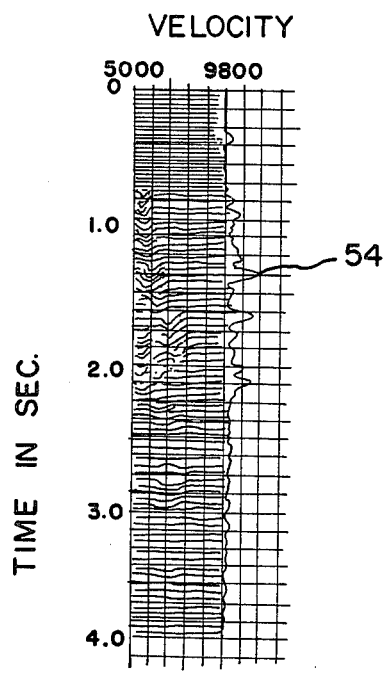
fig. 4
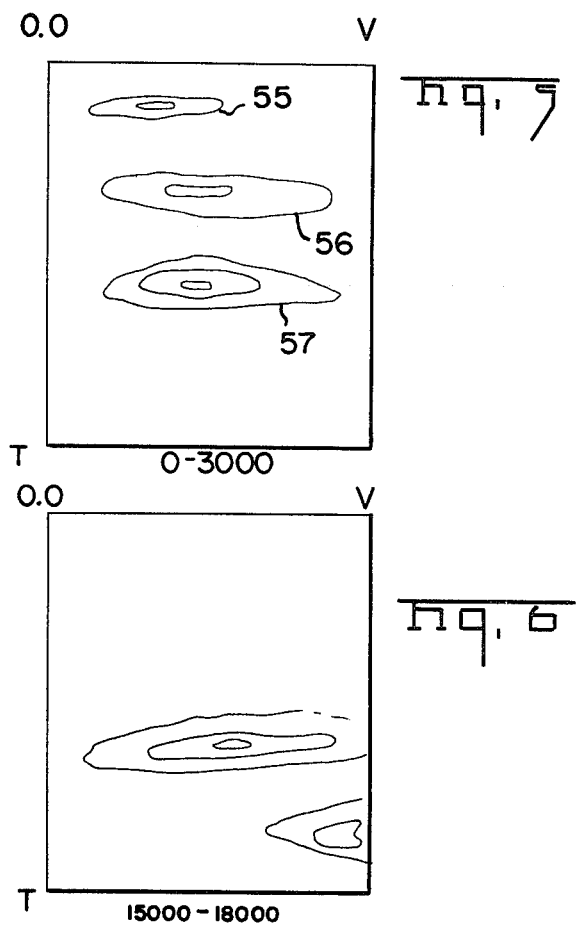
fig. 5
fig. 6
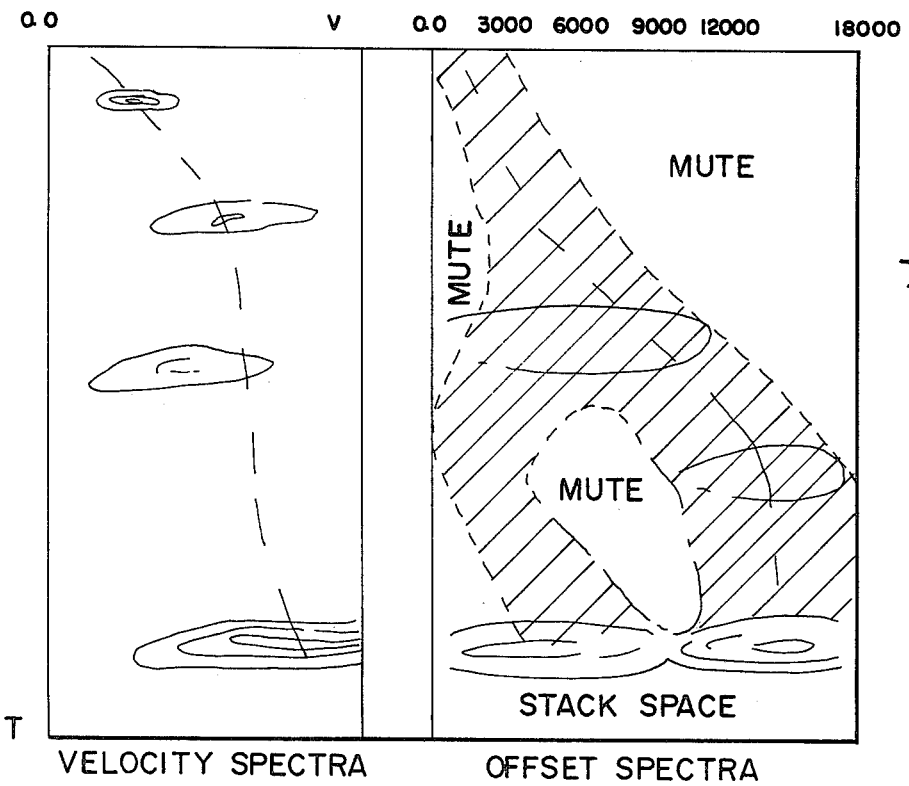
fig. 7

SELECTING OFFSET AS A FUNCTION OF TIME AND VELOCITY TO STACK SEISMOGRAMS WITH HIGH SIGNAL TO NOISE RATIO

BACKGROUND OF THE INVENTION

This invention relates to seismic exploration and more particularly to the stacking of seismograms to suppress noise and enhance the reflections on the seismograms.

In seismic exploration, seismic energy is generated by a source located at or near the surface of the earth, is reflected from subsurface interfaces between layers of the earth, and is received by a spread of seismic detectors having different offsets from the source on the surface of the earth. The detected seismograms are gathered, stacked, and recorded in the form of a set of common depth point (CDP) seismic traces as illustrated, for example, in FIG. 1 of U.S. Pat. No. 4,206,509—Ruehle. From these recorded CDP seismic traces the subsurface interval velocities can be determined. Such a CDP gathering and recording technique and a continuous velocity determination technique are disclosed in U.S. Pat. No. 3,651,451—Ruehle. An accurate velocity determination is quite important in the determination of the nature and extent of the subsurface layering.

It has long been recognized that not all field traces should be included in the stack. Some of the field traces have particularly high noise levels. These field traces are muted before the field records are gathered and stacked. The conventional way of determining which traces should be muted is by shooting a noise spread in the field. The seismograms from the noise spread define the noise and signal properties for each field array. Large amplitude noise, predominantly multiple refractions, surface waves, and multiple reflected shear refractions often interfere with the reflections on certain traces. These noise arrivals and the amplitude of the desired reflections, are determined from the seismograms from the noise spread. From the noise and reflection amplitudes, the ratio of reflection to noise amplitude as a function of time and offset, is determined. This ratio is used in a weighting matrix or selection matrix which selects the time offset continuation of field records which will best stack the traces. The noisy traces are muted and the remaining traces are stacked to obtain seismic sections with good signal to noise ratios. An interpreter analyzes the records from the field spread and picks the optimum time velocity offset function for stacking. Alternatively, procedures are available for automatically selecting this function. Coffeen, "Seismic Exploration Fundamentals", pp. 108–110, Petroleum Publishing Company, Tulsa, Okla. describes muting traces prior to stacking.

In accordance with the present invention, the velocity offset as a function of time is determined from the field traces in order to stack those traces with the highest signal to noise ratio.

SUMMARY OF THE INVENTION

In accordance with the present invention, noise in seismograms is suppressed by stacking only those seismograms having an offset with a high signal to noise ratio for the reflecting point being explored. The signal power of the field seismograms as a function of velocity and record time is determined for different ranges of source to receiver offset. The maximum signal power as a function of record time and velocity for these different ranges of offset is determined and plotted. From this determination, those traces with offset outside of the required signal power level are muted. The traces are then stacked.

In accordance with an important aspect of the invention, the maximum signal power of the traces as a function of velocity and record time are plotted as contours for different ranges of offset. From these contoured plots, the proper muting of the field seismograms can be accomplished.

The foregoing and other objects, features and advantages of the invention will be better understood from the following more detailed description and appended claims.

SHORT DESCRIPTION OF THE DRAWINGS

FIG. 3 is a plot of seismogram signal power as a function of velocity;

FIG. 4 shows velocity spectra for one range of offsets;

FIGS. 5a and 6 are contour plots of maximum signal power as a function of velocity and record time.

DESCRIPTION OF THE PREFERRED EMBODIMENT

Figure 2:
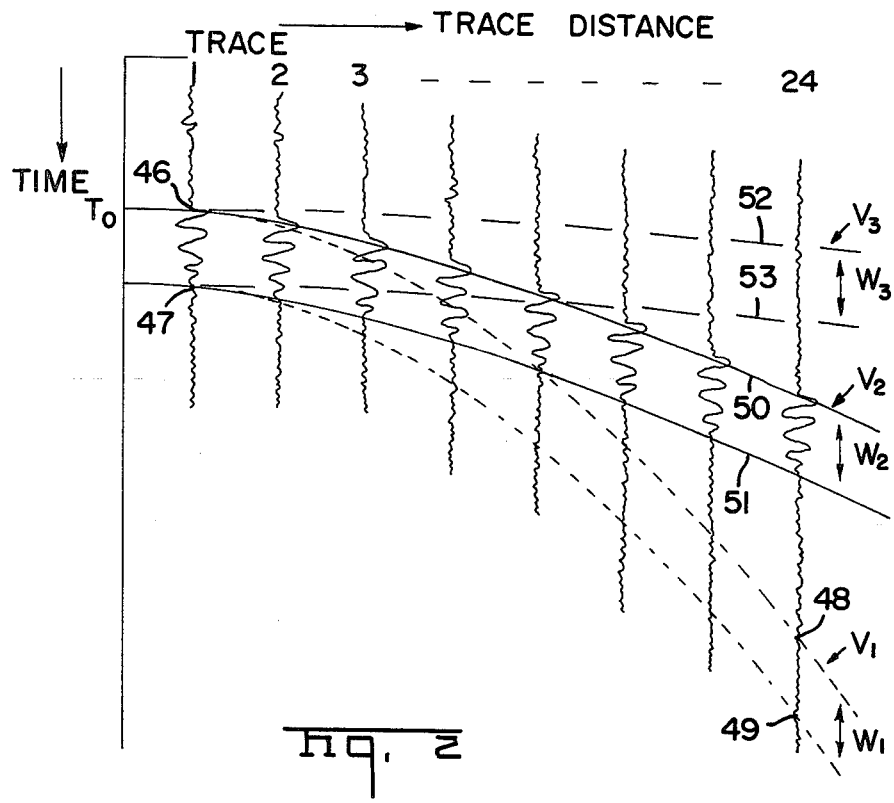
FIG. 2 depicts a field record including traces with different horizontal offsets.

FIG. 2 shows a plurality of traces obtained along a line of exploration on the earth, distance along this line of exploration being indicated as the abscissa. Each trace in FIG. 2 includes a seismic wavelet from a common reflector. The traces are obtained from detectors which have different offsets with respect to a source of seismic energy along the line of exploration.

Figure 1:
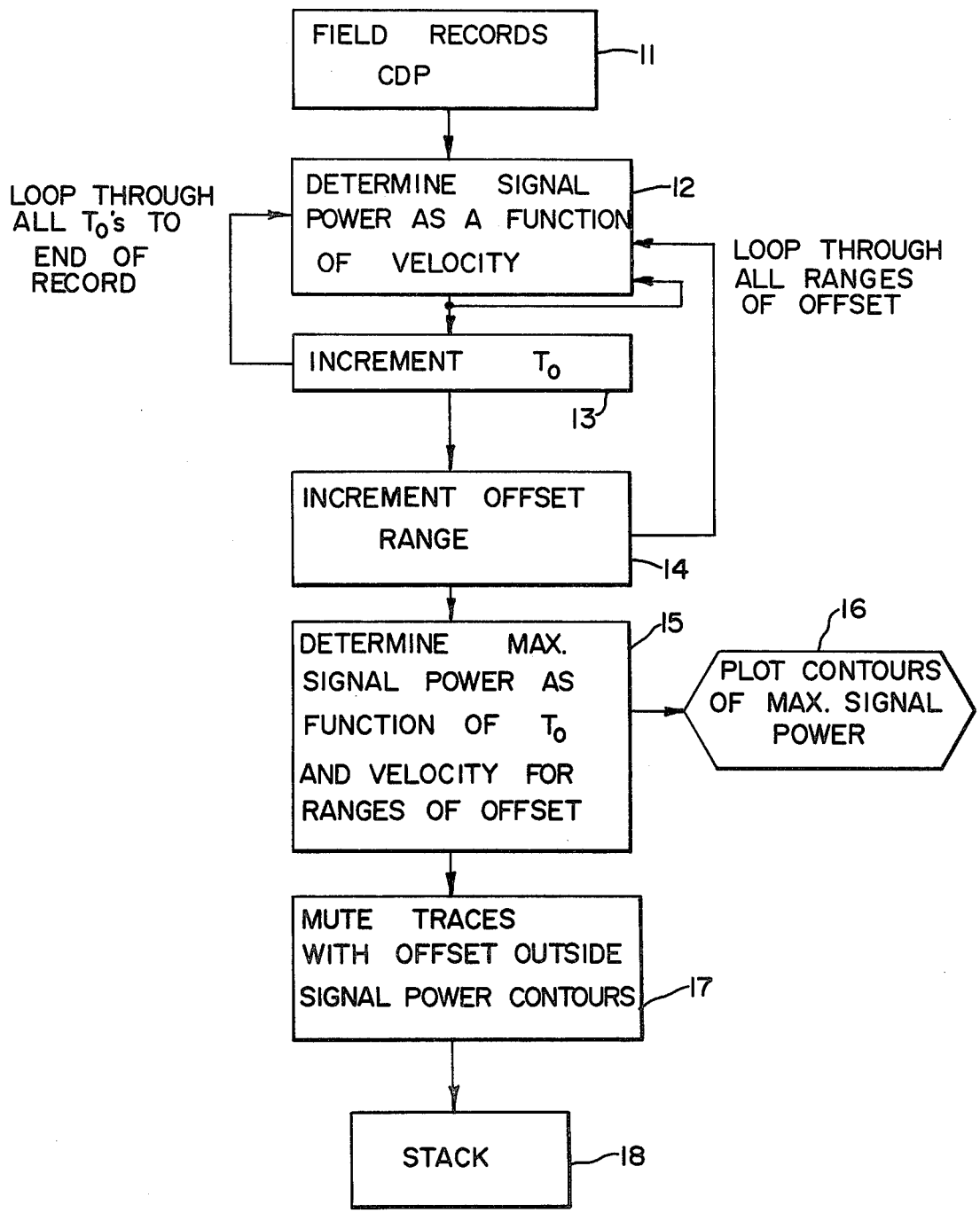
FIG. 1 is a flowsheet depicting the present invention.

These seismic traces are the input to the process of the present invention, as indicated at 11 in FIG. 1. The process of the present invention is an improvement on the process described in U.S Pat. No. 3,696,331—Guinzy, et al. and reference may be had to that patent for the details of the implementation of the invention. The traces are processed to determine the signal power of the reflections as a function of different values of assumed velocity.

The step of determining the signal power as a function of velocity is indicated at 12 in FIG. 1. The step may be better understood by referring to FIG. 2. In accordance with the particular signal detection technique being used, a window of each seismic trace is selected at different given values of vertical travel time. For example, at the travel time $T_O$ a seismic window between the points 46 and 47 for the first trace is selected. $T_O$ is the reflection arrival time at a shot to receiver offset of O. The window selected on the remaining traces is determined by using an assumed velocity $V_1$.

The corresponding vertical travel time, referred to as $T_x$, on the remaining traces is determined as will be subsequently described. Windows on these traces are selected, the window between the points 48 and 49 being selected for the twenty-fourth trace, for example. The signal in these windows is detected. Many signal detection techniques are suitable for use in the present invention and their use is within the scope of the invention. Signal detection is described, for example, in "Statistical Theory of Signal Detection," Carl W. Hellstrom, Pergammon Press, 1961. The particular form of detection described herein is a zero lag cross-correlation between the selected windows. In general, a function indicative of the presence of a signal is detected. In the cross-correlation technique, the signal power is detected.

Next, a different value of velocity, $V_2$, is assumed and the same operation is performed. Windows on each trace are selected, the selection being indicated by the limits of the lines 50 and 51. Again the signal power of all of these windows is detected. The search continues through all values of velocity in a given range. For example, a value of velocity $V_3$, is assumed and windows within the limits of the lines 52 and 53 are selected. The signal power of these windows is detected and stored.

It will be apparent that the signal power will be a maximum for the correct value of assumed velocity. This is best demonstrated in FIG. 3 which shows a plot of signal power as a function of assumed velocity for a particular value of vertical travel time $T_O$. The peak in the signal power at $V_2$ indicates that $V_2$ is the velocity for this seismic event.

Next, the vertical travel time $T_O$ is incremented as indicated at 13 in FIG. 1 and the foregoing steps are repeated for different, iterated values of vertical travel time. If the signal power as a function of velocity is plotted for each incremented value of vertical travel time, there is produced a plot of the type shown in FIG. 4. It can be seen that the plot of FIG. 4 provides a good indication of the changing velocity characteristics of the earth as a function of depth. The ordinate in FIG. 4 is time in seconds, but it will be appreciated that this can be directly converted to depth. In FIG. 4, the plot at the right represents the maximum signal power as a function of time. This plot of maximum signal power provides a good indication of the presence of reflecting interfaces, such as the reflection indicated at 54.

The foregoing procedure is repeated for each of a plurality of ranges of offset. For example, the offset ranges selected may be 0–3,000, 3,000–6,000, 6,000–9,000, 9,000–12,000, and 12,000–15,000 feet. The step of incrementing the offset range step through each of these ranges is indicated at 14 in FIG. 1. For each range, a velocity spectra such as that shown in FIG. 4 is generated. For each range of offsets and for each reflection on the seismograms, the maximum signal power is determined as a function of time and velocity as indicated at 15 in FIG. 1. That is, for each of the reflections such as indicated at 54 in FIG. 4, the maximum signal power as a function of velocity is determined. Contours of equal values of maximum signal power are plotted as indicated at 16. For each range of offset, this produces a plot of the type shown in FIG. 5. In FIG. 5 the set of contours 55 may correspond with the reflection 54 for example. Contours 56 and 57 correspond with other reflections on the set of seismograms. Note that for each reflection several contoured lines are produced. These correspond with the maximum signal power in the several peaks and troughs of the reflections. Note that in FIG. 2 the window between 46 and 47 has several peaks and troughs in the reflection. A contour line will be produced for each of the peaks.

A contour plot such as FIG. 5 is produced for each of the ranges of offset. The plot in FIG. 5 is for the range 0 to 3,000 feet and the plot in FIG. 6 is for the range 15,000–18,000 feet. Similar plots for other ranges are produced.

Figure 7:
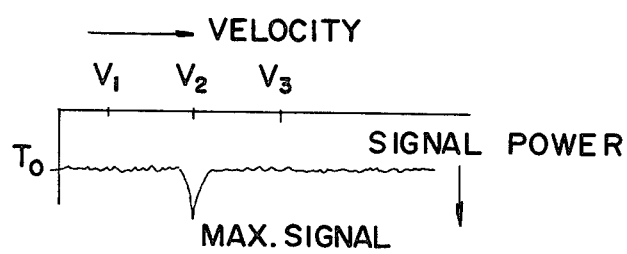
FIG. 7 shows the muting diagram for a set of field records.

The maximum signal power contours are displayed as a function of record time and offset in FIG. 7. From this diagram the traces having good signal power for different record times can be seen. Similarly, those having poor signal power are clearly defined. The plot in FIG. 7 is similar to a plot produced from normal noise spreads to show the muting of particular traces. The traces having poor signal to noise ratio are muted as indicated at 17 in FIG. 1. Then, the remaining traces are stacked to form the seismic cross-section as indicated at 18.

The invention can be practiced on many different types of apparatus which are commonly used in processing seismic traces. The computer system described in the foregoing U.S. Pat. No. 3,696,331 is suitable for use. It will be appreciated that the program described in that patent is suitable for use in implementing the present invention, except that instead of stepping through various values of dip as described in that patent, the procedure must be modified to step through various ranges of offset. From the velocity spectra produced by this procedure, the offset spectra of FIG. 7 are produced. FIG. 7 is used as a muting diagram to mute the traces with poor signal to noise ratio in accordance with the procedure previously mentioned in the Casseen book. The traces are then stacked.

While a particular embodiment has been shown and described, various modifications are within the true spirit and scope of the invention. The appended claims are, therefore, intended to cover all such modifications.

I claim:

1. The method of suppressing noise in seismograms representing the reflection of seismic energy comprising:
    obtaining seismic data from different reflecting points in the earth and from detectors each having a different offset from a common source of seismic energy along a line of exploration;
    detecting the signal power of said seismograms as a function of different values of assumed acoustic velocity of the earth;
    repeating the step of detecting for successive values of seismogram travel time $T_o$ and offset;
    determining the maximum signal power for each iterated value of travel time $T_o$ and offset;
    muting maximum power traces in predetermined offset ranges having poor signal to noise ratio; and
    stacking the seismograms having an offset with a high signal power for the reflecting point being explored.

2. The method recited in claim 1 further comprising plotting said maximum signal power for values of velocity as a function of travel time $T_O$ and for different ranges of offset to form contours of the maximum signal power as a function of time and offset and wherein contours represent reflections from said reflecting points.

* * * * *